United States Patent [19]
Anthony et al.

[11] 3,743,899
[45] July 3, 1973

[54] RADIATION-SENSITIVE SEMICONDUCTOR TARGET FOR A CAMERA TUBE

[75] Inventors: Michel Berth, Antony; Francois Desvignes, Bourg-la-Reine; Claude Piaget, Yerres, all of France

[73] Assignee: U.S. Philips Corporation, New York, N.Y.

[22] Filed: Dec. 7, 1971

[21] Appl. No.: 205,570

[30] Foreign Application Priority Data
Dec. 10, 1970  France .............................. 7044472

[52] U.S. Cl... 317/235 R, 317/235 N, 317/235 NA, 317/235 AC, 317/235 AD
[51] Int. Cl. ............................................ H01l 15/00
[58] Field of Search ................ 317/235 N, 235 NA, 317/235 AC, 235 AD

[56] References Cited
UNITED STATES PATENTS
3,408,521  10/1968  Dore et al. ............................ 313/94
3,440,476  4/1969  Crowell ................................. 315/10
3,672,992  6/1972  Schaeffer ............................ 117/219
3,289,024  11/1966  De Haan .............................. 313/65
3,371,213  2/1968  Adams ................................. 250/211

Primary Examiner—Martin H. Edlow
Attorney—Frank R. Trifari

[57] ABSTRACT

A radiation-sensitive semiconductor device particularly suitable as a photoconductive target for a camera tube sensitive to long wavelength radiation is constituted by a first layer of semiconductor material having a relatively small band gap, i.e., less than 1.5 eV and a superimposed layer of a semiconductor material having a relatively large band gap, i.e., greater than 1.5 eV. The first layer upon absorbing the incident radiation, generates charge carriers which are injected into the superimposed layer of larger band gap and hence of greater resistivity. The surface of the second layer may then be scanned by an electron beam in conventional manner to derive an output signal indicative of the radiation image impinging on the first layer.

4 Claims, 2 Drawing Figures

RADIATION-SENSITIVE SEMICONDUCTOR TARGET FOR A CAMERA TUBE

The invention relates to a radiation-sensitive semiconductor device for converting radiation into electric signals, in particular a semiconductor photoconductive target for a camera tube, adapted to produce an output signal representative of the radiation image impinging on the target.

As is known, the photoconductivity in a semiconductor layer is used in certain television camera tubes, on which layer the scene to be observed is projected by means of a suitable optical system and an output signal is derived from the camera tube representing the image projected on the target thereof. In its use as a photo responsive target, the semiconductor layer is periodically charged by scanning it with an electric beam of a small cross-section, the charge current varying from point to point and being greater at the points of the target which are illuminated the more strongly. Actually, the surface elements of the target behave as a plurality of capacitors the leakage currents of which depend upon the properties of the semiconductor such as the resistivity and the gradient of the doping concentration, and on properties of the incident radiation, such as the energy and the intensity; the respective capacitors discharge more rapidly when the intensity of the radiation impinging thereon is greater, provided that the energy of the impinging radiation is greater than a threshold which corresponds to the width of the band gap of the semiconductor material. The target may consist either of a thin layer of a semiconductive material having a high resistivity, or of a mosaic of semiconductor junctions which are biassed in the reverse direction by the electron beam. See, for example, U. S. Pat. No. 2,890,359 for the former construction, and U. S. Pat. No. 3,579,012 for the latter.

In one known form, the photoconductive semiconductor target consists of a photoconductive macroscopic homogeneous target of PbO which is obtained by vapor-depositing PbO in a residual atmosphere of oxygen and water on the inner surface of the entrance window of the tube on which a layer of conductive $SnO_2$ is previously provided. The target operates at room temperature, and is sensitive to radiation having a wavelength smaller than 0.6 $\mu$, which value corresponds to the band gap of PbO which is approximately 2 eV. The resistivity of the target material is very high (in the order of $10^{14}$ Ohm.cm) because of the large band gap of the material and because of the microscopic discontinuous structure of the layer. As a result of this, very low dark current values can be obtained which are necessary for the operation of the camera tube. The current density of the dark current preferably is smaller than $10^{-8}$ A cm$^{-2}$.

Similar properties are also found for targets which are manufactured from other semiconductor materials, for example, Se, $Sb_2 S_3$ or CdS – CdSe.

In order to make targets which are sensitive to radiation of longer wavelengths, for example, in the region of the infrared, it is necessary to use semiconductor materials having a smaller band gap. However, the use of such target materials is generally not feasible because the resistivity of the material which decreases rapidly with the width of the band gap, becomes too low and thereby the dark current of the camera tube becomes too large.

It is also possible to use the charge storage properties of junctions for generating the target signal. In that case the target consists of a mosaic of p-n junctions, the capacitance of which may be adapted to produce a discharge time constant as demanded by the scanning frequency of the electron beam and at the same time a sufficiently small lateral conductivity is obtained to produce a readily defined picture. However, even with this expedient the dark current of a junction is nevertheless determined by the width of the band gap of the material and the above noted disadvantage of homogeneous layers is not avoided.

In view of the foregoing, it has been proposed (see British Pat. No. 942,406) to make a camera tube with a target in the form of a mosaic of germanium junctions and to operate the target at a temperature which is at most equal to that of solid carbon dioxide at which temperature the spectral sensitivity of the target lies at approximately 1.7 $\mu$. The spectral sensitivity may be further shifted by using semiconductors having smaller band spacing, for example, InAs or InSb which, however, must be cooled to at least 77° K.

The radiation-sensitive semiconductor device which forms the subject matter of the present invention has a spectral response at the longer wavelengths and is substantially free from the drawbacks of the prior devices.

According to the invention, a radiation-sensitive semiconductor device comprises two semiconductor regions of different materials forming a heterojunction, a first of the said regions serving for absorption of incident radiation while generating charge carriers, and the second serving for accumulating or collecting the charge carriers generated in the first region, the band gap of the material of the second region being larger than the band gap of the material of the first region, and the band gap and doping of the second region being such that injection of minority charge carriers can occur from the first region via the heterojunction into the second region.

The second region preferably has such a resistivity that the leakage current is lower than approximately $10^{-8}$ A cm$^{-2}$.

In a preferred embodiment, the second semiconductor region is provided as a thin layer on the first region, for example by vapor-deposition.

An important embodiment of the device according to the invention is characterized in that the first region is a layer which is deposited on a substrate which is substantially permeable to the incident radiation. In this construction the permeable substrate may advantageously form an ohmic contact with the first region.

The semiconductor material of the first region preferably has a band gap smaller than 1.5 eV.

The semiconductor material of the second region preferably has a band gap exceeding 1.5 eV.

In order that the invention may be readily carried into effect, it will now be described in greater detail, by way of example, with reference to the accompanying drawings.

Figure 1:
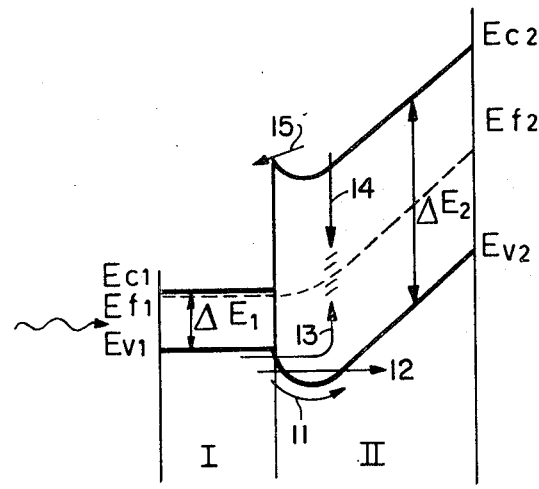
FIG. 1 shows schematically a band diagram corresponding to a radiation-sensitive device according to the invention.

In accordance with the invention, a semiconductor device particularly suitable as a target for a camera tube responsive to long wavelenth radiation, comprises superimposed layers or regions of two different semiconductor materials forming there between a heterojunction. The choice of the material of the first region in which the radiation absorbtion takes place is related to the wavelenth of the incident radiation. For example, InAs is suitable for detection of radiation to a wavelength of 3.5 $\mu$ and InSb to a wavelength of 5.6 $\mu$. The charge accumulation or storage function cannot be fulfilled by this same semiconductor unless it is cooled to a very low temperature, because of the small band gap of the material of the first region. According to the invention, for the accumulation or storage function another semiconductor material having a larger band gap is used, for example, germanium, silicon or composite materials with, for example, a common constituent with the absorbing semiconductor of the first region, such as InP, AlSb, GaAs. This second semiconductor material constitutes the semiconductor material of the second region.

It is to be noted that for materials with a band gap smaller than 1.5eV, preferably used for the first region, the resistivity of the layer is lower than is desirable. In such instances the resistivity may be increased either by cooling or by creating a disturbed or amorphous crystal structure over at least a part of the thickness of the layer. This crystal structure is obtained either by deposition in a vacuum under suitable conditions at a suitable substrate temperature or by a suitable rate of deposition. The resistivity may also be increased by ion bombardment of the deposited layer.

Consider, for example, the detection of a radiation of wavelength $\lambda = 5$ $\mu$. A semiconductor material suitable for detecting such radiation is InSb. The device may be manufactured, for example, as follows:

On substrate semiconductor substRate of, for example, n-type germanium, a layer of InSb is deposited according to the so-called "three temperatures" method (see for example, U.S. Pat. No. 3,441,000) with a thickness which may vary to, for example, 20 $\mu$m. The deposited layer is of the n-type and has a donor concentration $N_D$ in the low $10^{16}$ cm$^{-3}$ range. On this layer is vapor-deposited in a high vacuum a layer of substantially intrinsic germanium having a resistivity of approximately 50 Ohm. cm and a thickness of a few microns; the resistivity at the surface of said germanium layer is then increased by a bombardment with argon ions the energy of which is approximately 1 keV under a pressure which is reduced to approximately $10^{-1}$ Torr, the semiconductor layer being maintained approximately at room temperature. The argon bombardment is continued until the germanium resistivity becomes substantially equal to approximately $10^{13}$ Ohm.cm (at 77° K). It has been found experimentally that a later thermal treatment in hydrogen or in a vacuum, as a result of which the resistivity decreases, can also improve the sensitivity of the device.

It is also possible to use, instead of a thin deposited layer of InSb, a plate of monocrystalline InSb the effective operating portion of which is previously made thinner by a careful chemical etching until a thickness of 20 to 50 $\mu$ is obtained. The remaining processing is the same.

In the first example given above, an annular thermal and electric contact can be provided on the germanium substrate; in the second example, the contact is formed on the outer ring of the InSb plate which has not been made thinner. Soldering is carried out by alloying with indium in pure hydrogen on a flange of a ferro-nickel alloy having a suitable coefficient of expansion, available commercially as "Dilver P," and the flange is then secured to a cooling element.

Such a target can operate only at low temperatures owing to the presence of InSb, a semiconductor having a very small width of the forbidden band.

FIG. 1 shows diagrammatically a band gap diagram which corresponds to such a target. The negative polarity of the surface of the second region (II) as the result of the scanning electron beam creates a potential gradient which is present mainly in the germanium (II) of high resistivity. When the free carriers generated in the InSb first region (I) in which the radiation absorbtion takes place, are injected with an efficiency which is not equal to zero via the interface into the second region (II) — either by thermal effect or field effect, or by tunnel effect from band to band or from band to recombination center — a change in the potential difference occurs at the region of the target corresponding to the impingement point of the incident radiation between the surfaces of the layer (II) and consequently a variation of the leakage current at this point of the target.

In this manner a charge pattern is produced in the target by means of a single junction, the heterojunction, which pattern corresponds to the intensity distribution of the radiation incident on the target, which charge pattern can be read by means of one of the conventional scanning methods.

Figure 2:
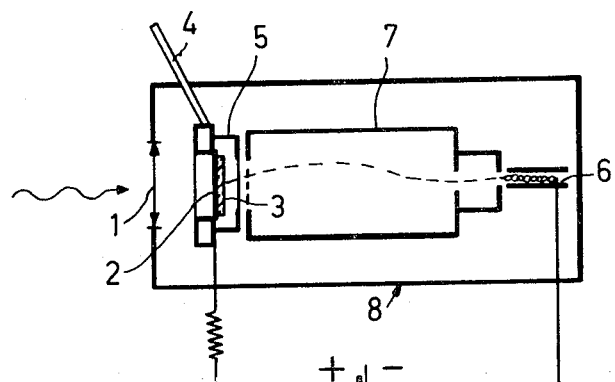
FIG. 2 shows diagrammatically a camera tube comprising a radiation-sensitive device according to the invention.

The camera tube (FIG. 2) comprises within an envelope 8 which is provided with a window 1 which is transparent to the incident radiation, a transparent support 2 of approximately 25 mm diameter on which the layers 3 of InSb and Ge are deposited, said support being surrounded by a cooling ring provided with an inlet for a cryogenic liquid and on which a diaphragm 5 is secured which screens the radiation from the surroundings on the rear side.

According to another embodiment, a layer of CdTe is deposited on the InSb.

In these various embodiments, the cooling, the object of which is to reduce the number of free carriers in the InSb, is carried out at a temperature (liquid nitrogen 77° K) which is considerably higher than the temperature which would be necessary if this semiconductor material were to be used to accumulate such carriers by means of a p-n junction (liquid helium 4° K).

A usual electronic optical system 7 enables the scanning and focusing of the electron beam originating from a gun 6.

According to another embodiment, the target may consist of a circular plate having a diameter of approximately 25 mm and consisting of InSb on which germanium is deposited, the plate being mounted on the cooling ring in a glass assembly as used in the preceding example.

Referring back to FIG. 1, $E_{v1}$ and $E_{v2}$ represent the valence band levels for the band diagrams of the regions I and II, $E_{c1}$ and $E_{c2}$ represent the corresponding conduction band levels, and $E_{f1}$ and $E_{f2}$ the corresponding Fermi levels. $\Delta E_1$ is the band gap for region I and $\Delta E_2$ is the band gap for region II. The lower arrows designated 11, 12 and 13 symbolize injection of minority carriers from region I into region II, and the upper arrows designated 14 and 15 symbolize flow of electrons.

We claim:

1. A camera tube comprising a photo-conductive target plate, means for impinging an incident radiation image on one side of the target plate, means for electrically contacting said one side of the target plate, means for scanning the opposite side of the target place with an electron beam, said target plate comprising a first layer adjacent the one side and a second layer adjacent the opposite side and adjoining the first layer, the first and second layers being of different semiconductive materials forming a heterojunction where they adjoin one another, the first layer having a band gap at which the incident radiation is absorbed therein generating free charge carriers, the second layer having a band gap that is larger than the band gap of the first layer and having a resistivity that is higher than the resistivity oF the first layer whereby minority charge carriers generated in the first layer will be injected into the second layer via the heterojunction.

2. A camera tube as set further in claim 1 wherein the band gap of the first layer is smaller than 1.5eV, and the band gap of the second layer is larger than 1.5eV.

3. A camera tube as set further in claim 2 wherein the second layer is a germanium or silicon.

4. A camera tube as set forth in claim 2 wherein the first layer is monocrystalline.

* * * * *